No. 689,002. Patented Dec. 17, 1901.
J. T. HILL, Dec'd.
T. HILL, Administrator.
MOTOR VEHICLE.
(Application filed July 8, 1901.)
(No Model.)
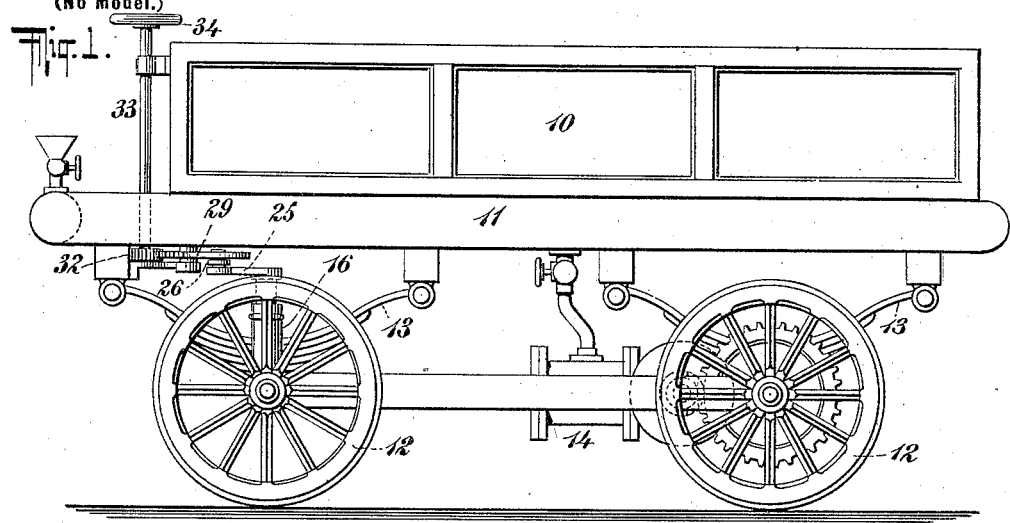
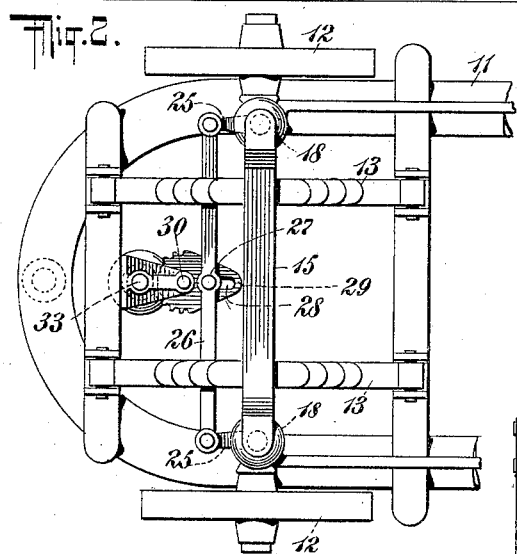
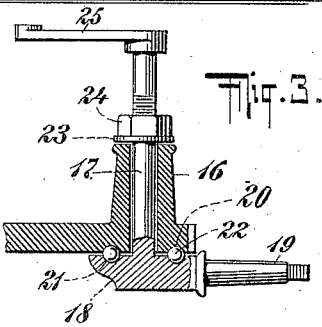
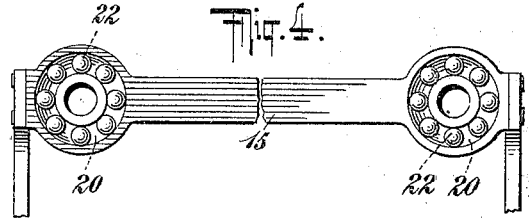
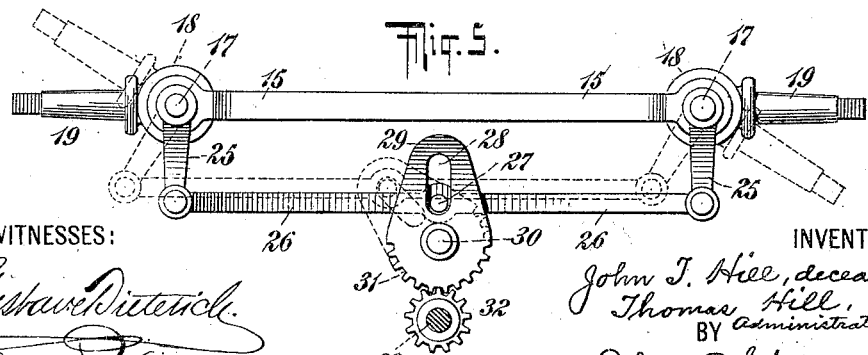
WITNESSES: Gustave Dieterich. John Fehlenbeck.
INVENTOR
John T. Hill, deceased,
Thomas Hill,
BY Administrator.
Chas. E. Gill
ATTORNEY

UNITED STATES PATENT OFFICE.

THOMAS HILL, OF JERSEY CITY, NEW JERSEY, ADMINISTRATOR OF JOHN THOMAS HILL, DECEASED.

MOTOR-VEHICLE.

SPECIFICATION forming part of Letters Patent No. 689,002, dated December 17, 1901.

Original application filed August 12, 1899, Serial No. 726,964. Divided and this application filed July 8, 1901. Serial No. 67,618. (No model.)

*To all whom it may concern:*

Be it known that JOHN THOMAS HILL, deceased, late a citizen of the United States, and late residing at Jersey City, in the county of Hudson and State of New Jersey, did invent new and useful Improvements in Motor-Vehicles, of which the following is a specification.

The invention relates to improvements in motor-vehicle; and it consists in the novel features and combinations of parts hereinafter described, and particularly pointed out in the claims.

The present invention pertains more especially to a novel construction and arrangement of parts for use in steering the vehicle and connected with or embodied in the front portion of the running-gear of the vehicle.

The object of the invention is to provide a very simple, comparatively inexpensive, and extremely durable and reliable steering-gear, and said invention will be fully understood from the detailed description hereinafter presented, reference being had to the accompanying drawings, in which—

Figure 1 is a side elevation of a motor-vehicle constructed in accordance with and embodying the invention. Fig. 2 is a bottom view of the front portion of same. Fig. 3 is a central vertical transverse section through a portion of the axle-bar and the support for one of the axles for the front wheels. Fig. 4 is a bottom view of the front axle-bar, and Fig. 5 is a detached top view, partly in section, of the steering-gear.

In the drawings, 10 designates the body of the vehicle; 11, a combined reservoir and supporting-frame for said body; 12, the customary wheels, and 13 the springs intermediate said wheels and said supporting-frame 11.

The body 10 will be of any suitable form and construction and will vary with the character of the work the vehicle may be intended to perform. The combined reservoir and supporting-frame 11 will receive the oil or other power-generating substance employed in connection with the engine 14 for driving the rear wheels 12. The reservoir 11, engine 14, and gearing for the rear axle do not form any part of the present invention, which is confined to the steering-gear at the front portion of the vehicle. The front axle-bar 15 is in one integral piece and is provided at its ends with the vertical sleeves 16, through which pass the vertical axially-rotatable standards 17, connected at their lower ends with the base-plates 18, carrying the axles 19 for the front wheels 12 of the vehicle. The axle-bar 15, below the vertical sleeves 16, is formed with an annular groove 20, corresponding with a similar groove 21, formed in the aforesaid base-plates 18, and within the grooves 20 21 are arranged the series of balls 22, whereby a ball-bearing is formed intermediate the upper surfaces of the base-plates 18 and the adjacent lower surfaces of the axle-bar 15. The base-plates 18 are kept up against the balls 22 by means of the washers 23 and nuts 24, provided upon the axially-rotatable standards 17, as more clearly indicated in Fig. 3.

Upon the upper ends of the axially-rotatable vertical standards 17 are secured the lever-arms 25, which extend frontward on parallel lines and are connected at their front ends by the link-bar 26, having at its central portion a vertical pin 27, freely passing within a longitudinal slot 28, formed in the rear portion of the plate 29, which is secured upon a fixed pivot 30 and is formed along its front edge with the gear-teeth 31, the latter being in mesh with the gear-wheel 32, rigidly secured upon the vertical shaft 33, having at its upper end the hand-wheel 34, in convenient relation to the front of the body 10 to enable its operation by the motorneer. The link-bar 26, plate 29, gear-wheel 32, vertical shaft 33, and hand-wheel 34 are employed for moving the axles 19 of the front wheels 12, and thus the said elements constitute the steering-gear for the vehicle. The rotation of the hand-wheel 34 in either direction will result in simultaneous motion being imparted to the front axles 19 by moving said axles in the opposite directions, as indicated in Fig. 5, wherein the right-hand axle 19 is shown as having been turned on the arc of a circle toward the front and the left-hand axle as having turned in a corresponding manner toward the rear. The rotation of the hand-wheel 34 and vertical shaft 33 results in the gear-wheel 32 having a corresponding motion and in imparting a reverse motion to the combined toothed and cam plate 29, the latter turning on its pivot 30 and operating, through the walls of its elongated slot 28, in connection with the pin 27, to shift the link-bar 26 laterally and cause thereby the vertical standards 17 to have an axial motion within the vertical sleeves 16, formed on the ends of the axle-bar 15. The motion of the vertical standards 17 is imparted to the base-plates 18, and the rotation of the latter results in the movement of the axles 19 and the proper guiding of the vehicle. The hand-wheel 34 may be turned either toward the right or left, as occasion may require, and in either instance the link-bar 26 will be shifted to turn the vertical standards 17 and move the axles 19. The plate 29 may freely turn in either direction upon the pivot 30 and when turned will positively move the link-bar 26 simply to the extent desired and governed wholly by the extent of motion manually imparted to the hand-wheel 34 and vertical shaft 33.

The invention is not limited to the special motor-vehicle illustrated, but is intended for application to any and all motor-vehicles adapted to receive the same.

What is claimed herein is—

1. In a vehicle, the front axle-bar 15 having the vertical sleeves 16, and the vertical standards 17 within said sleeves and having at their upper ends the arms 25 and at their lower ends the base-plates 18 connected with the front axles 19, combined with the bar 26 connecting said arms 25, and means for shifting said bar laterally to turn said standards and said axles; substantially as and for the purposes set forth.

2. In a vehicle, the front axle-bar 15, the vertical sleeves 16 at the ends thereof, and the vertical standards 17 within said sleeves and having at their upper ends the arms 25 and at their lower ends the base-plates 18 connected with the front axles 19, combined with the link-bar 26 connecting said arms 25, the pivoted plate 29 engaging said bar 26 for shifting the latter, the vertical shaft 33 adapted for manual operation, and gearing intermediate said shaft 33 and said plate 29 for communicating motion from said shaft to said plate; substantially as and for the purposes set forth.

3. In a vehicle, the front axle-bar 15, the vertical sleeves 16 at the ends thereof, and the vertical standards 17 within said sleeves and having at their upper ends the arms 25 and at their lower ends the base-plates 18 connected with the front axles 19, combined with the link-bar 26 connecting said arms 25 and having the pin 27, the pivoted plate 29 having the teeth 31 and slot 28 and engaging with said slot said pin, and the vertical operating-shaft 33 having the gear 32 in engagement with said teeth 31; substantially as and for the purposes set forth.

4. In a vehicle, the front axle-bar 15 having at its ends the sleeves 16 and grooves 20, the vertical axially-rotatable standards 17 within said sleeves, the base-plates 18 connected with the lower ends of said standards and having the grooves 21 and front axles 19, the balls 22 within said grooves, and the nuts 24 for holding base-plates up against said balls, combined with means for rotating said standards 17 and thereby turning said axles 19 radially; substantially as set forth.

Signed at New York, in the county and State of New York, this 29th day of March, 1901.

THOMAS HILL,
*Administrator of John Thomas Hill, deceased.*

Witnesses:
GUNDER GUNDERSON,
CHAS. C. GILL.